W. H. MAYO.
Excelsior Machines.
No. 136,529.  Patented March 4, 1873.
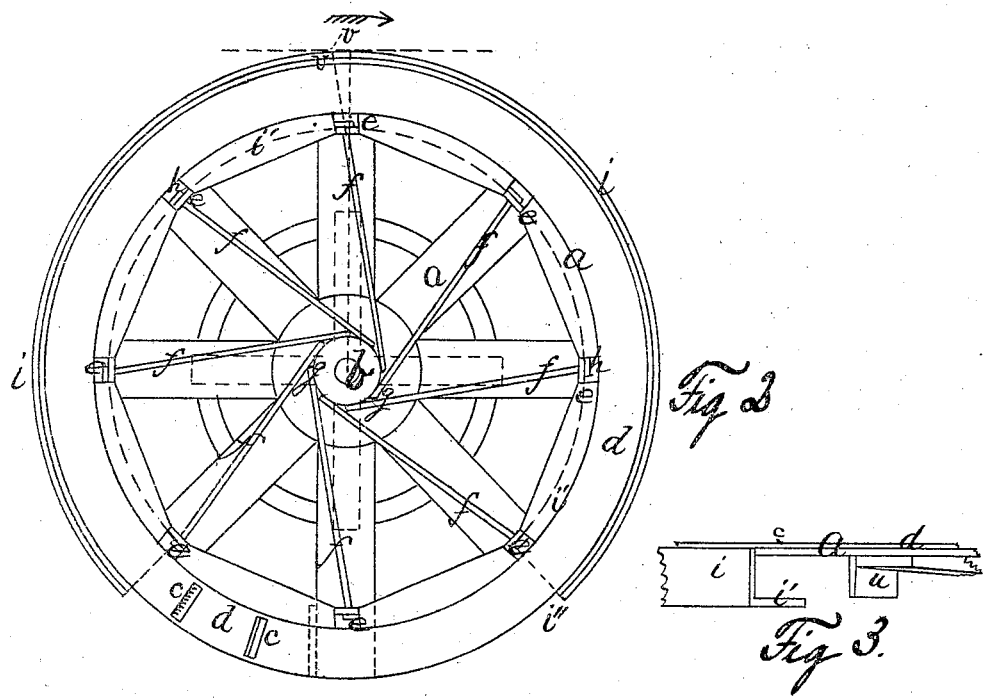
Fig. 2.
Fig. 3.
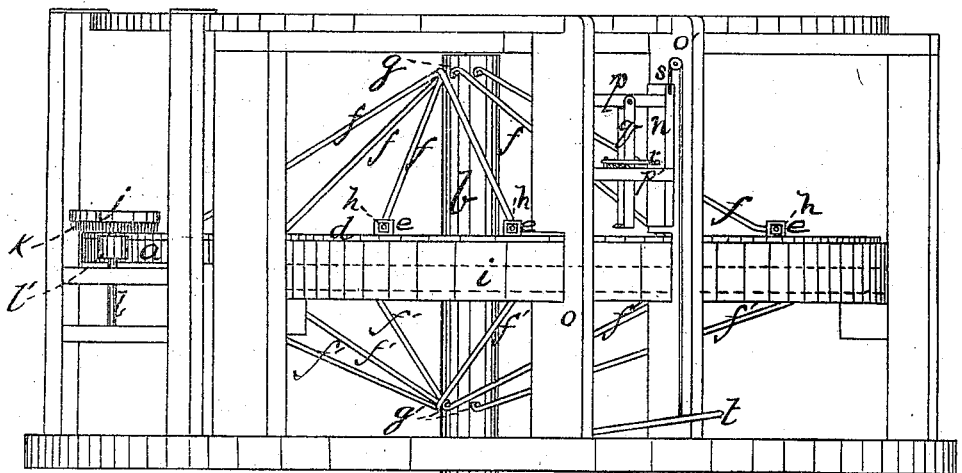
Fig. 1.
Witness  Inventor
Wm. H. Mayo
Per Atty Wm. Franklin Seavey

UNITED STATES PATENT OFFICE.

WILLIAM H. MAYO, OF ORONO, MAINE.

IMPROVEMENT IN EXCELSIOR-MACHINES.

Specification forming part of Letters Patent No. 136,529, dated March 4, 1873.

*To all whom it may concern:*

Be it known that I, WILLIAM H. MAYO, of Orono, in the county of Penobscot and State of Maine, have invented a new and useful Improved Excelsior-Machine; and I hereby declare the following to be a full, clear, and exact description of the same, which will enable others skilled in the art to make and use my invention, reference being had to the accompanying drawing forming a part of this specification, in which—

Figure 1 shows a side elevation; Fig. 2, a plan of wheel and trough or rim; Fig. 3, an end view of same, showing the device for removing the excelsior.

Same letters show like parts.

My invention relates to a rotary excelsior-machine, in which the knives are placed in the circumference of sufficient size to allow them to move around the circle without cutting too much across the grain of the bolt. My improvements consist, first, in the construction of the wheel, peculiarly strengthening and adapting it for its work; second, in a trough to receive, and a device for removing therefrom the excelsior as it is made; third, in a device for keeping the knives or cutters clean and free from dust; and, fourth, in the bolt holding and feeding device.

Referring to the drawing, $a$ shows the wheel. I have found that one eighteen feet in diameter works well, supported upon an upright shaft, $b$, to which the power is attached. Near the circumference of the wheel are placed the cutting devices, as is commonly done, fixed in a metal rim, $d$, if preferred; and inside of this rim, at regular intervals above and below the wheel are lips $e\ e$, projecting enough to receive the ends of rods $f f f' f'$, extending from said lips to the shaft above and below the wheel, respectively. The ends attached to the lips are secured by being passed through holes therein, and having nuts screwed thereon, the other ends of the rods being fastened to the shaft. The nuts at the end of each rod enable any portion of the wheel which may have sagged to be leveled up with ease, by setting up the rods in its immediate vicinity. These rods $f f'$ do not extend to the shaft radially, but form obtuse angles $y$ on the side from which the wheel is turned, with tangents drawn at right angles to radiuses from the center of the shaft $b$ through the lips, as illustrated in dotted lines in Fig. 2. They thus answer a three-fold purpose—they resist the centrifugal force, keep the wheel horizontal, and assist the shaft in revolving the wheel, giving it, in effect, a hold on the wheel from the points $g$, where the rods $f$ are attached to the shaft, to the points $g'$, where the rods $f'$ are secured. The body of the wheel may be framed as desired, with a view to lightness and strength. The rods enable it to be held or leveled perfectly, by adjusting the nuts at their ends at $h\ h$.

To receive the excelsior dropping under the wheel from the knives or cutters, I surround three-quarters or more of the circumference of the wheel with a trough or box, $i\ i$, extending to the top of the wheel on the sides and underneath the knives. (See dotted lines Fig. 2.) I then attach to one of the arms or spokes of the wheel a brush, $u$, or equivalent device, just sweeping the bottom $i'$ of the trough as the wheel revolves. This gathers the excelsior which may have collected therein, and delivers it at the opening $i''$, preventing it from clogging the wheel. To clean the knives and remove the excelsior from the top of the wheel, I provide a wheel, $j$, having a brush, $k$, on its under side, so arranged that it extends over and sweeps the rim $d$ of the wheel. It is provided with a shaft, $l$, upon which is a friction-roll, $l'$, bearing against the rim of the wheel $a$, which revolves it as it turns, thus clearing the knives.

The feed-works of my machine consist of a frame, $n$, sliding in grooves in standards $o\ o'$, and having cross-bars $p\ p'$, to the upper one of which is pivoted a hanging bar, $q$, having claws at its lower end, and a lever, $r$, near its center, by which it may be moved. A rack on the cross-bar $p'$ enables the lever to be secured in any position. The bolt is inserted between the claws of the bar $q$ and corresponding claws on one side of the frame $n$, (not seen in the drawing,) and held in place by setting the claws by means of the lever. The weight of the frame and bolt keeps the bolt down to the knives, and a rope attached to the frame, as shown at $s$, and passing over a pulley on the standard $o'$, above it, to a foot-lever, $t$, enables it to be easily raised when the bolt is to be inserted.

I do not limit myself to any particular size for the wheel $a$, nor to any particular number of knives or cutters, this being merely a question of construction. Two or more openings may be left in the trough or box, if desired.

What I claim as my invention, and desire to secure by Letters Patent, is—

1. The trough or box $i$, for the reception of the excelsior, or a portion of it, in combination with a removing device attached to the wheel $a$, substantially as described.

2. A revolving brush, as described, operated by a friction-wheel $l$ bearing against the rim of the driving-wheel $a$, for clearing the knives or cutters.

WM. H. MAYO.

Witnesses:
SAML. B. STONE, Jr.,
WM. FRANKLIN SEAVEY.